(12) United States Patent
Akuzawa (10) Patent No.: US 10,592,265 B2
(45) Date of Patent: Mar. 17, 2020

(54) APPLICATION EXECUTION APPARATUS EQUIPPED WITH VIRTUAL MACHINE CONTROLLING INSTALLED APPLICATION, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Masao Akuzawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 133 days.

(21) Appl. No.: 15/657,789

(22) Filed: Jul. 24, 2017

(65) Prior Publication Data
US 2018/0039504 A1 Feb. 8, 2018

(30) Foreign Application Priority Data
Aug. 4, 2016 (JP) .................. 2016-153652

(51) Int. Cl.
*G06F 9/455* (2018.01)
*G06F 9/451* (2018.01)
*G06F 9/44* (2018.01)
*H04N 21/431* (2011.01)
*G06F 3/0484* (2013.01)
*G06F 3/0488* (2013.01)
*G06T 11/00* (2006.01)

(52) U.S. Cl.
CPC .......... *G06F 9/45529* (2013.01); *G06F 9/44* (2013.01); *G06F 9/451* (2018.02); *G06F 9/45508* (2013.01); *H04N 21/4312* (2013.01); *G06F 3/0484* (2013.01); *G06F 3/0488* (2013.01); *G06F 9/45533* (2013.01); *G06T 11/00* (2013.01)

(58) Field of Classification Search
USPC .......................................................... 718/1
See application file for complete search history.

(56) References Cited

U.S. PATENT DOCUMENTS

| | | | | |
|---|---|---|---|---|
| 6,658,483 B1 * | 12/2003 | Iwamoto | ............. | H04L 67/2823 709/223 |
| 6,990,480 B1 * | 1/2006 | Burt | ............. | G06F 17/246 |
| 8,417,059 B2 * | 4/2013 | Yamada | ............. | H04N 5/23248 348/154 |
| 8,418,169 B2 * | 4/2013 | Ushiku | ............. | G06F 9/4843 709/223 |
| 8,744,147 B2 * | 6/2014 | Torti | ............. | G16H 15/00 382/128 |
| 9,195,450 B2 * | 11/2015 | Smith | ............. | G06F 8/65 |

(Continued)

FOREIGN PATENT DOCUMENTS

JP 2006171274 A 6/2006

*Primary Examiner* — Abu Zar Ghaffari
(74) *Attorney, Agent, or Firm* — Rossi, Kimms & McDowell LLP (57) ABSTRACT

An application execution apparatus that is capable of preventing display of an incomplete image. A virtual machine controls an installed application. A reference unit refers to attribute information showing whether an application draws a background of an image when the application draws the image. And a setting unit sets so that the virtual machine draws the background when it is not set that the application draws the background of the image to the attribute information.

10 Claims, 8 Drawing Sheets

(56) References Cited

U.S. PATENT DOCUMENTS

| | | | | |
|---|---|---|---|---|
| 9,639,749 B2* | 5/2017 | Kim | | G06K 9/00409 |
| 9,933,916 B1* | 4/2018 | Streete | | G06F 11/32 |
| 10,097,999 B2* | 10/2018 | Furuichi | | H04W 4/70 |
| 2004/0111665 A1* | 6/2004 | Ishihara | | G06K 15/102 |
| | | | | 715/211 |
| 2006/0140508 A1* | 6/2006 | Ohgishi | | G06T 1/00 |
| | | | | 382/284 |
| 2008/0075370 A1* | 3/2008 | Hanyu | | G06K 9/38 |
| | | | | 382/195 |
| 2008/0077917 A1* | 3/2008 | Chen | | G06F 9/45558 |
| | | | | 718/1 |
| 2008/0089660 A1* | 4/2008 | Hashimoto | | H04N 9/8042 |
| | | | | 386/336 |
| 2008/0177994 A1* | 7/2008 | Mayer | | G06F 9/4418 |
| | | | | 713/2 |
| 2009/0087096 A1* | 4/2009 | Eaton | | G06K 9/38 |
| | | | | 382/190 |
| 2009/0103681 A1* | 4/2009 | Kramp | | A61B 6/481 |
| | | | | 378/98.12 |
| 2009/0141048 A1* | 6/2009 | Fujimoto | | H04N 19/17 |
| | | | | 345/673 |
| 2009/0147014 A1* | 6/2009 | Minematsu | | G06F 9/45533 |
| | | | | 345/545 |
| 2009/0196457 A1* | 8/2009 | Zuro | | H04N 5/2258 |
| | | | | 382/100 |
| 2009/0310184 A1* | 12/2009 | Suzuki | | H04N 1/00867 |
| | | | | 358/1.18 |
| 2009/0328033 A1* | 12/2009 | Kohavi | | G06F 9/5027 |
| | | | | 718/1 |
| 2010/0208986 A1* | 8/2010 | Cobb | | G06K 9/00771 |
| | | | | 382/165 |
| 2011/0010642 A1* | 1/2011 | Nagai | | G06F 9/455 |
| | | | | 715/760 |
| 2011/0096153 A1* | 4/2011 | Kobayashi | | G11B 20/10 |
| | | | | 348/51 |
| 2011/0276653 A1* | 11/2011 | Matsui | | H04N 19/176 |
| | | | | 709/217 |
| 2011/0292428 A1* | 12/2011 | Ishii | | G06F 3/0482 |
| | | | | 358/1.13 |
| 2012/0066679 A1* | 3/2012 | Pappas | | G06F 9/45558 |
| | | | | 718/1 |
| 2012/0249585 A1* | 10/2012 | Ohkawa | | G06F 3/04883 |
| | | | | 345/629 |
| 2013/0259363 A1* | 10/2013 | Ozawa | | G06K 9/4652 |
| | | | | 382/164 |
| 2014/0156778 A1* | 6/2014 | Luxenberg | | H04L 67/2842 |
| | | | | 709/213 |
| 2014/0245292 A1* | 8/2014 | Balani | | G06F 9/5077 |
| | | | | 718/1 |
| 2015/0029362 A1* | 1/2015 | Jeong | | G06T 11/60 |
| | | | | 348/231.2 |
| 2015/0212728 A1* | 7/2015 | Omura | | G06F 3/0416 |
| | | | | 345/173 |
| 2015/0294649 A1* | 10/2015 | Imamura | | G09G 5/36 |
| | | | | 345/641 |
| 2015/0375548 A1* | 12/2015 | Yamasaki | | B41J 29/38 |
| | | | | 347/5 |
| 2016/0127654 A1* | 5/2016 | Kraft | | G06T 19/006 |
| | | | | 348/239 |
| 2016/0142580 A1* | 5/2016 | Sakahara | | H04N 1/2154 |
| | | | | 348/207.2 |
| 2016/0378311 A1* | 12/2016 | Kim | | G06F 3/04845 |
| | | | | 715/769 |
| 2017/0364317 A1* | 12/2017 | Nagasaka | | G06F 3/1203 |

\* cited by examiner

| | EXTENDED APPLICATION 208 | APPLICATION X | APPLICATION Y |
|---|---|---|---|
| IDENTIFIER | 1 | 2 | 3 |
| APPLICATION NAME | MENU | ERROR RECOVERY | BROWSER |
| BACKGROUND DRAWING ATTRIBUTE | TRUE | FALSE | NOT SET |
| SCREEN SIZE | 800×400 | 640×400 | 800×600 |

FIG. 8

APPLICATION EXECUTION APPARATUS EQUIPPED WITH VIRTUAL MACHINE CONTROLLING INSTALLED APPLICATION, CONTROL METHOD THEREFOR, AND STORAGE MEDIUM STORING CONTROL PROGRAM THEREFOR

BACKGROUND OF THE INVENTION

Field of the Invention

The present invention relates to an application execution apparatus equipped with a virtual machine controlling an installed application, a control method therefor, and a storage medium storing a control program therefor.

Description of the Related Art

An MFP (Multifunction Peripheral) is known as an application execution apparatus into which a virtual machine module (hereinafter referred to as a "virtual machine", simply), such as a Java (registered trademark) VM (Virtual Machine), is built. A plurality of extended application modules (hereinafter referred to as an "extended application", simply) that extend functions can be installed in an MFP, and a virtual machine controls installed extended applications. When an extended application is installed in an MFP, an icon showing the extended application is displayed on an operation screen of the MFP, for example. When a user selects the icon concerned, the MFP performs a display control process that displays an image of a GUI (Graphical User Interface) of the extended application (hereinafter referred to as an "extended application GUI") corresponding to the selected icon. In a general display control process, a virtual machine draws a background of an extended-application GUI with a background color set up beforehand by an extended application, and then, the extended application draws the remaining extended-application GUI other than the background.

However, some extended applications that are installed in an MFP draw the entire extended-application GUI including a background at the time of displaying the extended-application GUI. Although such an extended application draws the entire extended-application GUI including a background, a virtual machine may also draw the background of the extended-application GUI according to the specification of the system. In such a case, since the background of the extended-application GUI is drawn multiple times, a flicker at the time of displaying extended-application GUI becomes remarkable. On the other hand, there is a proposed technique that prohibits a virtual machine from drawing a background in a drawing process for an extended-application GUI (for example, see Japanese Laid-Open Patent Publication (Kokai) No. 2006-171274 (JP 2006-171274A)).

However, the technique of JP 2006-171274A mentioned above causes a problem that an incomplete extended-application GUI that lacks a background is displayed when an extended application of which specification defines that a virtual machine draws a background of an extended-application GUI is executed.

SUMMARY OF THE INVENTION

The present invention provides an application execution apparatus, a control method thereof, and a storage medium storing a control program therefor, which are capable of preventing display of an incomplete image.

Accordingly, a first aspect of the present invention provides an application execution apparatus including a virtual machine configured to control an installed application, a reference unit configured to refer to attribute information showing whether an application draws a background of an image when the application draws the image, and a setting unit configured to set so that the virtual machine draws the background when it is not set that the application draws the background of the image to the attribute information.

Accordingly, a second aspect of the present invention provides a control method for an application execution apparatus equipped with a virtual machine that controls an installed application, the control method including a reference step of referring to attribute information showing whether an application draws a background of an image when the application draws the image, and a setting step of setting so that the virtual machine draws the background when it is not set that the application draws the background of the image to the attribute information.

Accordingly, a third aspect of the present invention provides a non-transitory computer-readable storage medium storing a control program causing a computer to execute the control method of the second aspect.

Accordingly, a fourth aspect of the present invention provides a non-transitory computer-readable storage medium storing a control program causing a computer to execute an application installed in an application execution apparatus characterized in that the program includes attribute information showing whether the application draws a background of an image when the application draws the image.

According to the present invention, the display of an incomplete image is prevented.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Although a case where the present invention is applied to an MFP as an application execution apparatus will be described in the embodiment, a destination to which the present invention is applied is not restricted to an MFP. The present invention is applicable to an apparatus in which an extended application that performs a drawing process for an extended-application GUI is installable.

Figure 1:
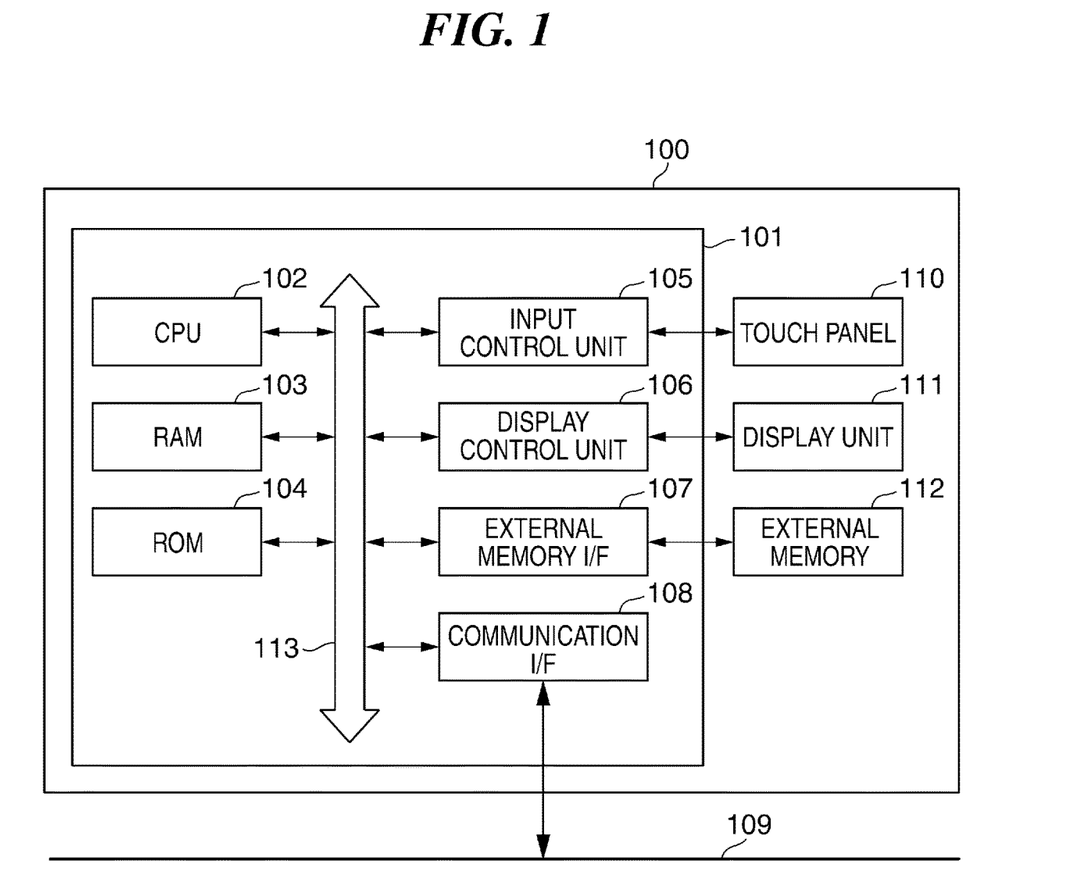
FIG. 1 is a block diagram schematically showing a configuration of an MFP as an application execution apparatus according to an embodiment of the present invention.

FIG. 1 is a block diagram schematically showing a configuration of the MFP 100 as an application execution apparatus according to the embodiment of the present invention.

As shown in FIG. 1, the MFP 100 is provided with a control unit 101, a touch panel (an attribute information setting unit) 110, a display unit 111, and an external memory 112. The control unit 101 is connected with the touch panel 110, display unit 111, and external memory 112. The control unit 101 is provided with a CPU 102, a RAM 103, a ROM 104, an input control unit 105, a display control unit 106, an external memory I/F 107, and a communication I/F 108. The CPU 102, RAM 103, ROM 104, input control unit 105, display control unit 106, external memory I/F 107, and communication I/F 108 are mutually connected through a system bus 113.

A plurality of extended applications that extend functions are installable to the MFP 100. The control unit 101 totally controls the entire MFP 100. The CPU 102 executes each process of a software module 200 in FIG. 2 by running a program stored in the ROM 104. The RAM 103 is a volatile memory. The RAM 103 is used as a working area of the CPU 102, and is used as a temporary storage area for data. The ROM 104 is a nonvolatile memory and stores programs that the CPU 102 executes and data. The input control unit 105 performs data communication with the touch-panel 110 and input devices (not shown), such as a keyboard and a mouse, that receive user's operations. The display control unit 106 controls a display of an image on the display unit 111. The external memory I/F 108 reads data from the external memory 112, and writes data into the external memory 112. The communication I/F 108 controls communication with an external apparatus (not shown) that is connected to a network 109 etc.

The touch panel 110 detects a user's touch operation by a method, such as a resistance film method, a capacitive sensing method, a surface acoustic wave method an infrared method, an electromagnetic induction method, an image recognition method, or a photosensor method. Transparency of the touch panel 110 is defined so as not to disturb the display of the display unit 111. The touch panel 110 is attached on a screen of the display unit 111 integrally, and a positional coordinate of the touch panel 110 is associated with a display coordinate of the display unit 111. Thereby, the user gets operational feeling as if the user directly operates the image displayed on the display unit 111. Moreover, the touch panel 110 sends coordinate information that shows a position where the user touched on the touch panel 110 to the control unit 101. The display unit 111 displays an image of a GUI that is used for settings of the MFP 100. The external memory 112 is a storage unit connectable with the MFP 100, such as a hard disk, floppy disk, CD, DVD, and memory card.

Figure 2:
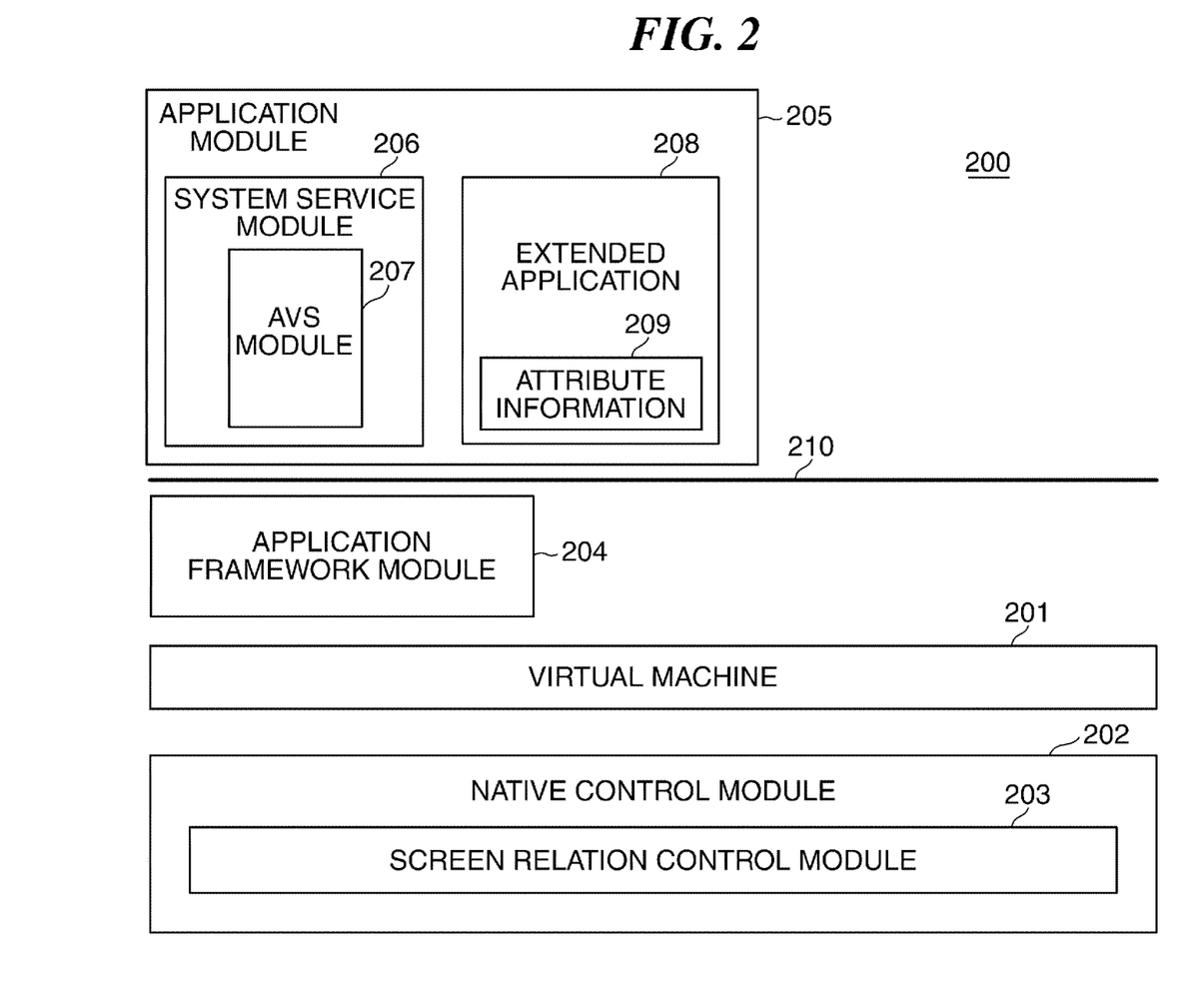
FIG. 2 is a block diagram schematically showing a configuration of software modules of the MFP shown in FIG. 1.

FIG. 2 is a block diagram schematically showing a configuration of the software module 200 of the MFP 100 shown in FIG. 1.

As shown in FIG. 2, the software module 200 is provided with a virtual machine 201, a native control module 202, an application framework module 204, an application module 205, and an API (Application Programing Interface) 210. The native control module 202 is provided with a screen relation control module 203. An application module 205 is provided with a system service module 206 and an extended application 208. The system service module 206 is provided with an AVS (Applet Viewer Service) module 207. The extended application 208 includes attribute information 209 that shows whether the extended application 208 is specified to draw a background of an extended-application GUI. Each process of the software module 200 is executed when the CPU 102 runs a program stored in the ROM 104. It should be noted that the embodiment is predicated on a case where the application module 205 is provided with one extended application 208 in order to simplify the description. However, the application module 205 may be provided with a plurality of installed extended applications.

The virtual machine 201 provides execution environment of the application module 205. The virtual machine 201 is provided with functions, such as a code interpretation function, a command control function, a resource management function, a graphic process control function, and an event control function. The code interpretation function is a function for interpreting a compiled byte code, and the command control function is a function for controlling a native command interpreted by the virtual machine 201. The resource management function is a function for managing a resource that is needed for execution of each process by the application module 205 and a resource that is needed when a process is requested from the native control module 202. The graphic process control function is a function for sending a drawing request to the native control module 202 according to a drawing instruction from the application module 205. The event control function is a function for notifying the application module 205 of detection of a change of state of the MFP 100, such as detection of an input operation through the touch panel 110, detection of the network connection in the communication I/F 108.

The native control module 202 controls the input control unit 105 and display control unit 106. The screen relation control module 203 displays an image, such as a setting menu (not shown) for making a user select an extended application that the user desires to execute from among a plurality of extended applications installed, on the display unit 111. Moreover, when detecting an input operation, such as a touch down, touch on, touch up, move, touch off, and flick, on the touch panel 110, the screen relation control module 203 converts a position at which the input operation is performed into coordinate information. Furthermore, the screen relation control module 203 outputs an input-operation detection notice showing that the input operation on the touch panel 110 is detected to the virtual machine 201. When a drawing request is sent from the virtual machine 201 in response to the input-operation detection notice, the screen relation control module 203 displays an image corresponding to the drawing request concerned on the display unit 111. For example, when the extended application 208 is selected in the setting menu (not shown), the screen relation control module 203 switches a display screen on the display unit 111 from the above-mentioned setting menu to an extended-application GUI. The application framework module 204 controls boot etc. of each module of the application module 205.

The application module 205 achieves standard functions, such as a calculation process, a character string process, a communication process, a screen control process, and an encryption process, of the MFP 100, and extended functions by extended applications. When an extended application is installed in the MFP 100, the system service module 206, which is beforehand inserted in the MFP 100, sets the extended application concerned to be executable.

Figure 3A:
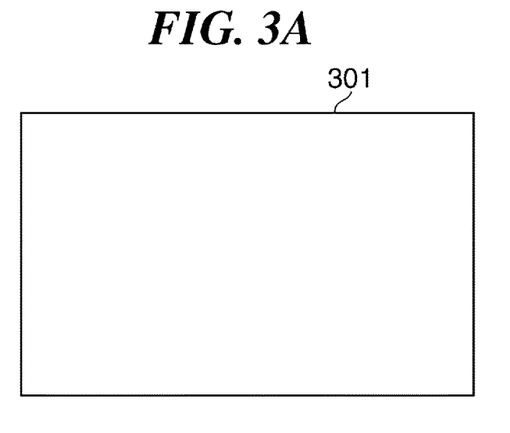
FIG. 3A, FIG. 3B, and FIG. 3C are views describing an applet registered by the MFP shown in FIG. 1.
Figure 3B:
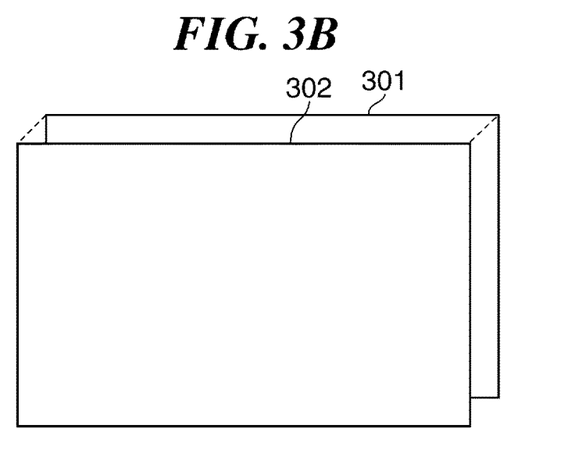
Figure 3C:
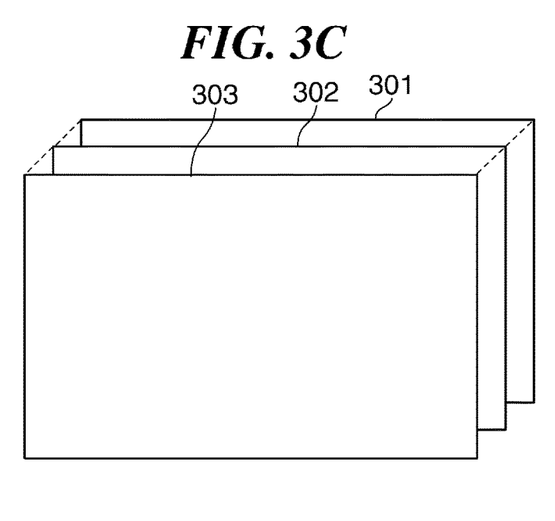

The AVS module 207 is a program for displaying a frame of the extended-application GUI on boot of the AVS module 207, and requests the virtual machine 201 to generate the frame 301 shown in FIG. 3A. The frame 301 is denoted by the java.awt.frame class of Java, for example. Moreover, the AVS module 207 registers an applet 302 (drawing information) shown in FIG. 3B and an applet 303 shown in FIG. 3C that are used for displaying an image on the display unit 111 with the frame 301 in response to applet registration requests received from the extended application 208. Each of the applets 302 and 303 includes specifications about an image displayed, such as a size of an image, information about text fields or buttons, and information about a background color. The applet 302 is a program for displaying an extended-application GUI, for example. The applet 303 is a program for displaying an error image, for example. In the embodiment, a plurality of applets can be registered with the frame 301. When being registered with the frame 301, the display attribute of the applets 302 and 303 is set in an invisible state, and a predetermined display condition is set up to each of the applets 302 and 303. Only an applet, for example the applet 302, that satisfies the predetermined display condition among the registered applets 302 and 303 is set in a visible state. The MFP 100 displays an extended-application GUI corresponding to the applet 302 concerned on the display unit 111.

Furthermore, the AVS module 207 obtains application information like the attribute information 209 that shows the specification of the extended application from the extended application 208 etc., and requests the virtual machine 201 to set up the obtained application information. When receiving the display request of the extended-application GUI from the extended application 208, or when detecting a user's input operation with the native control module 202, the AVS module 207 displays the extended-application GUI on the display unit 111.

The extended application 208 is an application for extending the function of the MFP 100, and requests the AVS module 207 to register the applet 302 on boot of the extended application 208 concerned. The above-mentioned attribute information 209 is beforehand set to the extended application 208. For example, when the specification of the extended application 208 defines that the extended application does not draw a background of the extended-application GUI, "TRUE" is set to the attribute information 209. When the specification defines that the extended application 208 draws the background, "FALSE" is set to the attribute information 209. The extended application 208 refers to a standard library (not shown) that consists of byte codes compiled so to be processable by the virtual machine 201 through the API 210. The standard library is a library for achieving achieves standard functions, such as a calculation process, a character string process, a communication process, a screen control process, and an encryption process, of the MFP 100.

Figure 4:
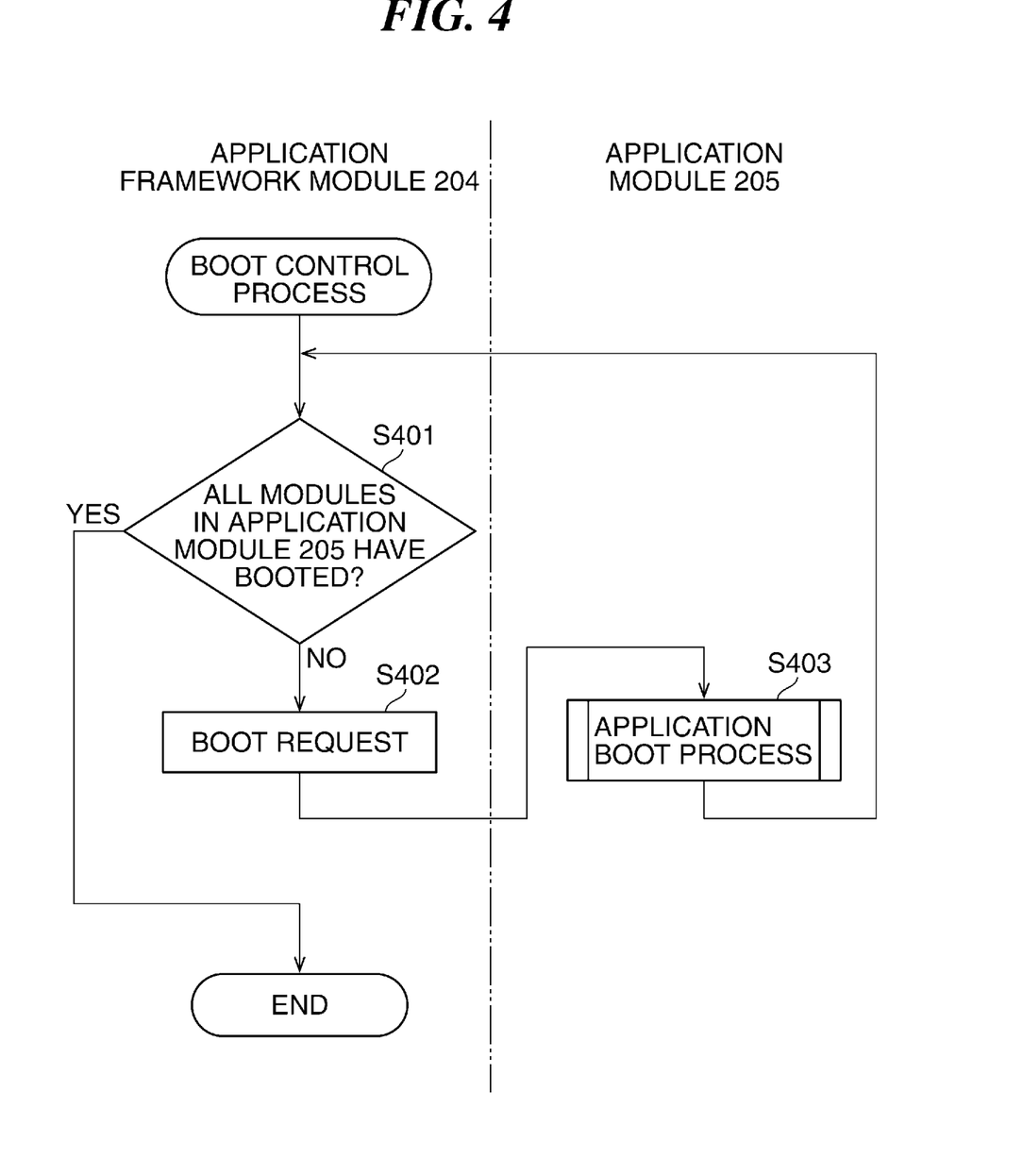
FIG. 4 is a flowchart showing a boot control process executed by the MFP shown in FIG. 1.

FIG. 4 is a flowchart showing a boot control process executed by the MFP 100 shown in FIG. 1.

The process in FIG. 4 is executed by the application framework module 204 and application module 205 when the CPU 102 runs the program stored in the ROM 104.

In FIG. 4, when receiving a boot request of the application module 205 from the virtual machine 201, the application framework module 204 determines whether all the modules in the application module 205 have booted (step S401).

As a result of the determination in the step S401, when all the modules in the application module 205 have booted, the application framework module 204 finishes this process. On the other hand, as a result of the determination in the step S401, when not all the modules of the application module 205 have booted, the application framework module 204 sends a boot request for a module that has not been booted to the application module 205 (step S402). Next, when receiving the boot request from the application framework module 204, the application module 205 executes an application boot process shown in FIG. 5 mentioned later (step S403), boots a module that has not been booted, and returns the process to the step S401.

Figure 5:
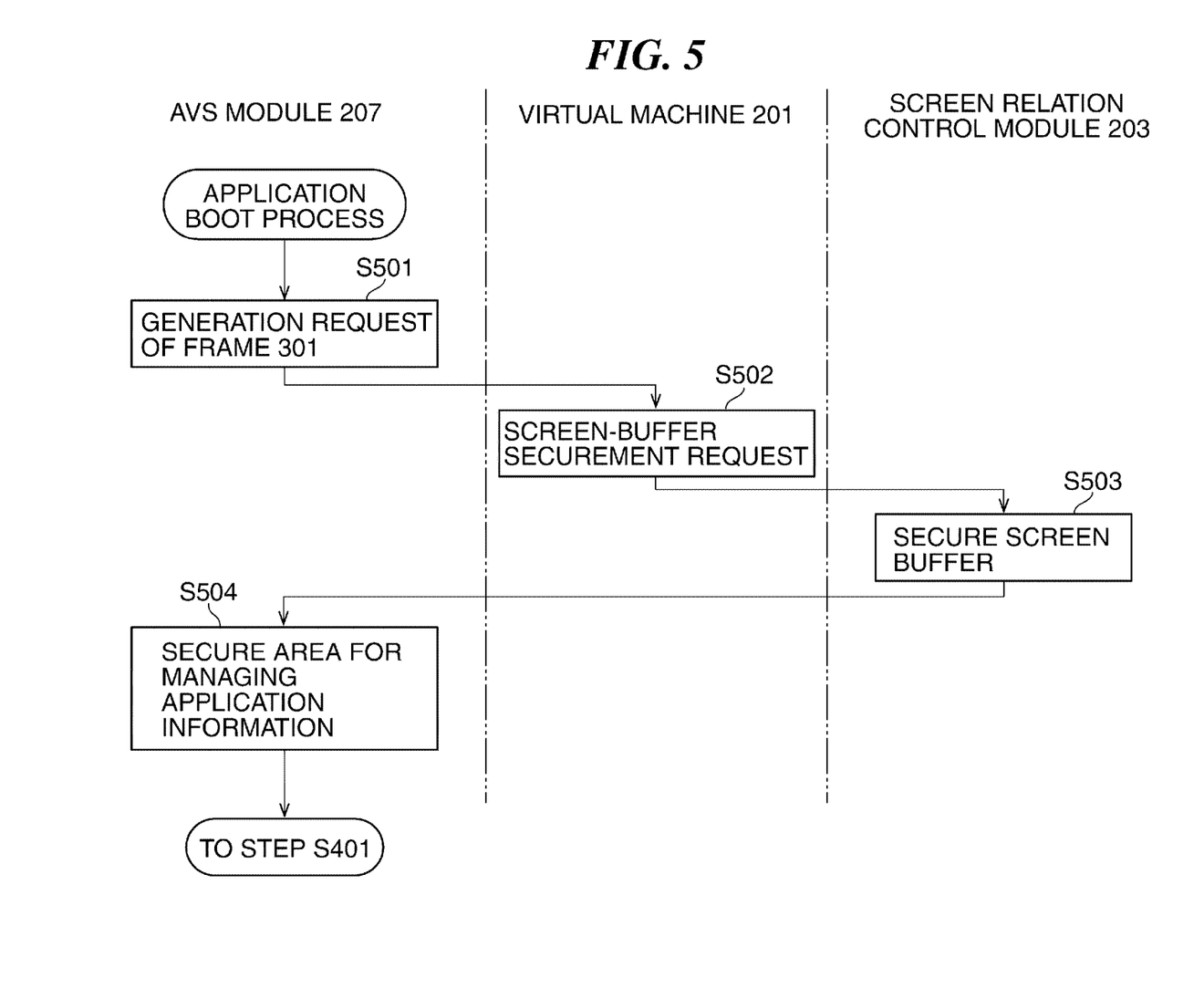
FIG. 5 is a flowchart showing procedures of an application boot process in step S403 in FIG. 4.

FIG. 5 is a flowchart showing procedures of the application boot process in the step S403 in FIG. 4.

The process in FIG. 5 is premised on the case where the application framework module 204 sends the boot request for the AVS module 207 to the application module 205. The process is executed by the AVS module 207, virtual machine 201, and screen relation control module 203.

In FIG. 5, the AVS module 207 executes the boot process in response to the boot request from the application framework module 204, and sends a generation request of the frame 301 to the virtual machine 201 when the boot process is completed (step S501). Next, the virtual machine 201 sends a screen-buffer securement request corresponding to the frame 301 to the screen relation control module 203 in response to the generation request concerned (step S502). Next, the screen relation control module 203 secures a screen buffer corresponding to the frame 301 in the RAM 103 in response to the screen-buffer securement request concerned (step S503). After that, the screen relation control module 203 sends a securement notice showing that the screen buffer was secured to the AVS module 207 through the virtual machine 201. Next, when receiving the securement notice, the AVS module 207 secures an area used for managing the application information about the extended applications installed in the MFP 100 in the ROM 104 etc. (step S504), and executes the process in the step S401 in FIG. 4. When the execution of the process in FIG. 4 is completed, the application module 205 waits until receiving the registration request for an applet from the extended application 208.

Figure 6:
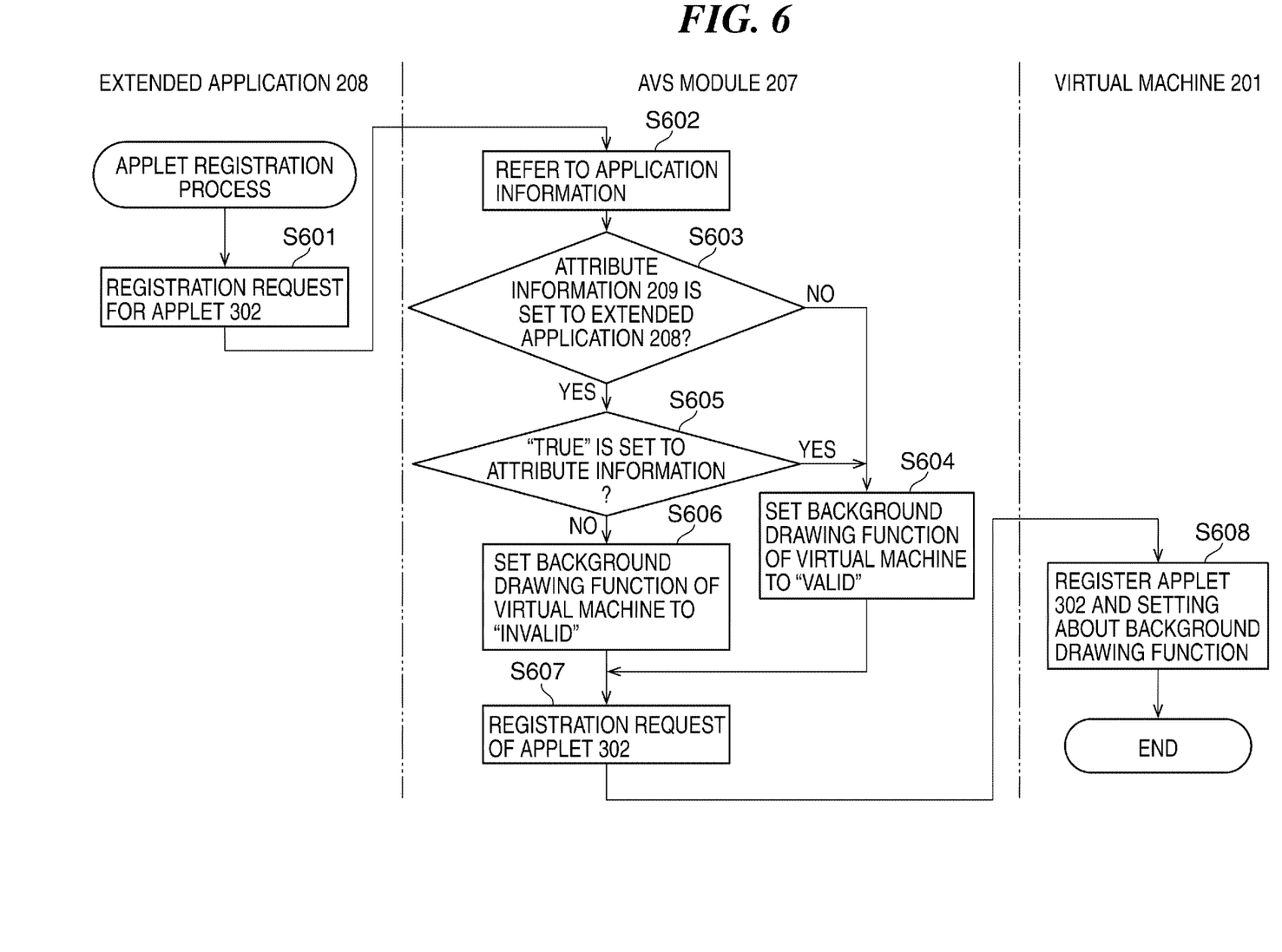
FIG. 6 is a flowchart showing procedures of an applet registration process executed by the MFP shown in FIG. 1.

FIG. 6 is a flowchart showing procedures of an applet registration process executed by the MFP 100 shown in FIG. 1.

The process in FIG. 6 is executed by the extended application 208 of the application module 205, the AVS module 207, and the virtual machine 201, after execution of the process in FIG. 5 is completed, when the CPU 102 runs the program stored in the ROM 104.

Figure 7:
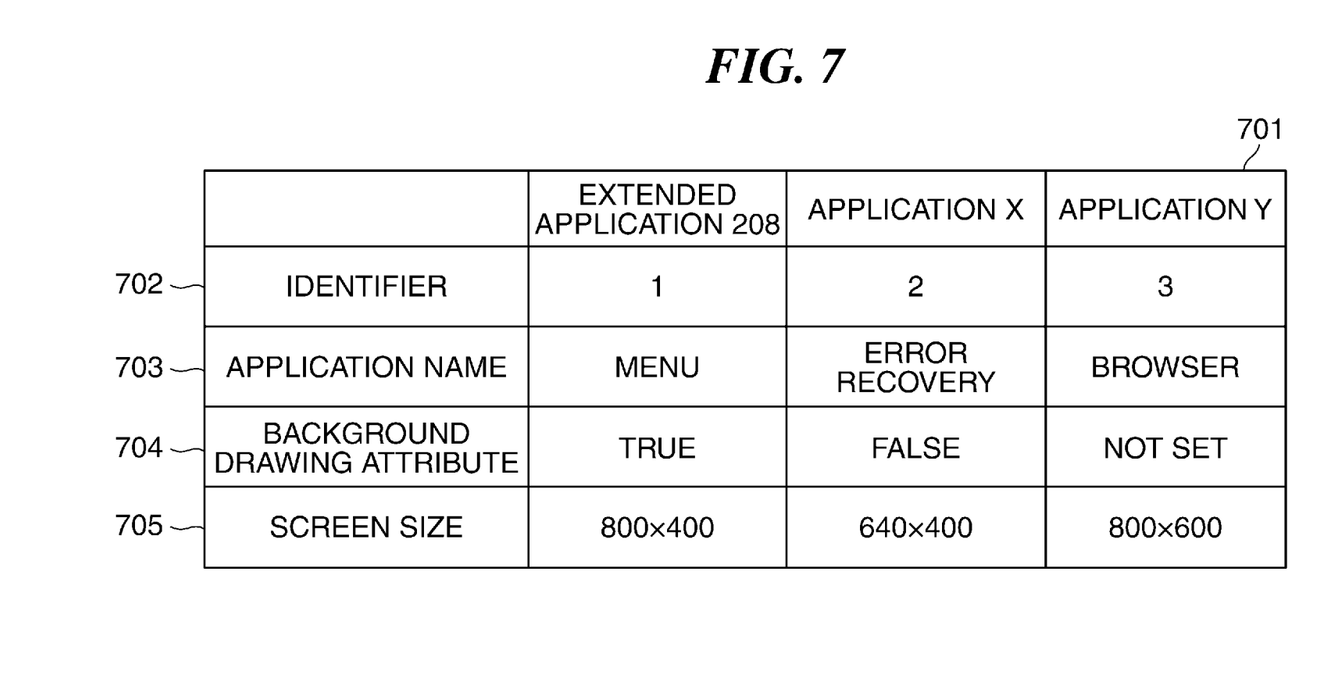
FIG. 7 is a view showing an example of management data for managing application information about extended applications installed in the MFP shown in FIG. 1.

In FIG. 6, the extended application 208 sends the registration request for the applet 302 to the AVS module 207 first (step S601). Next, the AVS module 207 refers to the application information about the extended application 208 that sent the registration request (step S602). In the embodiment, when an extended application is installed in the MFP 100, the application information about the extended application concerned is set to management data 701 in FIG. 7 stored in the ROM 104. The management data 701 includes the application information about all the installed extended applications. The management data 701 is provided with an identifier 702, an application name 703, a background-drawing attribute 704, and a screen size 705. The identifier 702 is the serial number allocated uniquely in order to identify an extended application. It is a UUID (Universally Unique Identifier), for example, the application name 703 is information that shows a type of an extended application. The background-drawing attribute 704 is information corresponding to the attribute information 209. The screen size 705 is a size of each image, such as an extended-application GUI. Although the method for managing the application information by setting the application information about all the installed extended applications to the management data 701 is described in the embodiment, the management method for the application information is not limited to this. The application information about each extended application is enough to be managed so as to be readable by the AVS module 207. For example, the application information may be directly stored in the ROM 104 for each application.

Next, the AVS module 207 determines whether the attribute information 209 is set to the extended application 208 (step S603). In the step S603, when "TRUE" or "FALSE" is set to the background-drawing attribute 704 of the extended application 208 in the management data 701, it is determined that the attribute information 209 is set to the extended application 208, for example. On the other hand, when "NOT SET" is set to the background-drawing attribute 704 of the extended application 208 in the management data 701, it is determined that the attribute information 209 is not set to the extended application 208.

As a result of the determination in the step S603, when the attribute information 209 is not set to the extended application 208, the AVS module 207 enables the background drawing function of the virtual machine 201, i.e., the AVS module 207 sets up so that the virtual machine 201 will execute the background drawing process (step S604). Next, the AVS module 207 executes a process in step S607 mentioned later.

As a result of the determination in the step S603, when the attribute information 209 is set to the extended application 208, the AVS module 207 determines whether "TRUE" is set to the attribute information 209 (step S605).

As a result of the determination in the step S605, when "TRUE" is set to the attribute information 209, the AVS module 207 proceeds with the process to step S604. That is, in the embodiment, when "FALSE", which shows that the specification defines that the extended application 208 draws the background, is not set to the attribute information 209, it is set so that the virtual machine 201 executes the background drawing process. On the other hand, as a result of the determination in the step S605, when "FALSE" is set to the attribute information 209, the AVS module 207 disables the background drawing function of the virtual machine 201, i.e., it is set so that the virtual machine 201 does not execute the background drawing process (step S606). Next, the AVS module 207 sends a registration request for the applet 302 for registering the applet 302 into the frame 301 to the virtual machine 201 (step S607). Next, the virtual machine 201 associates and registers the applet 302 and the setting about the background drawing function in response to the applet registration request received from the AVS module 207 in step S608 (a registration unit), and finishes this process.

Figure 8:
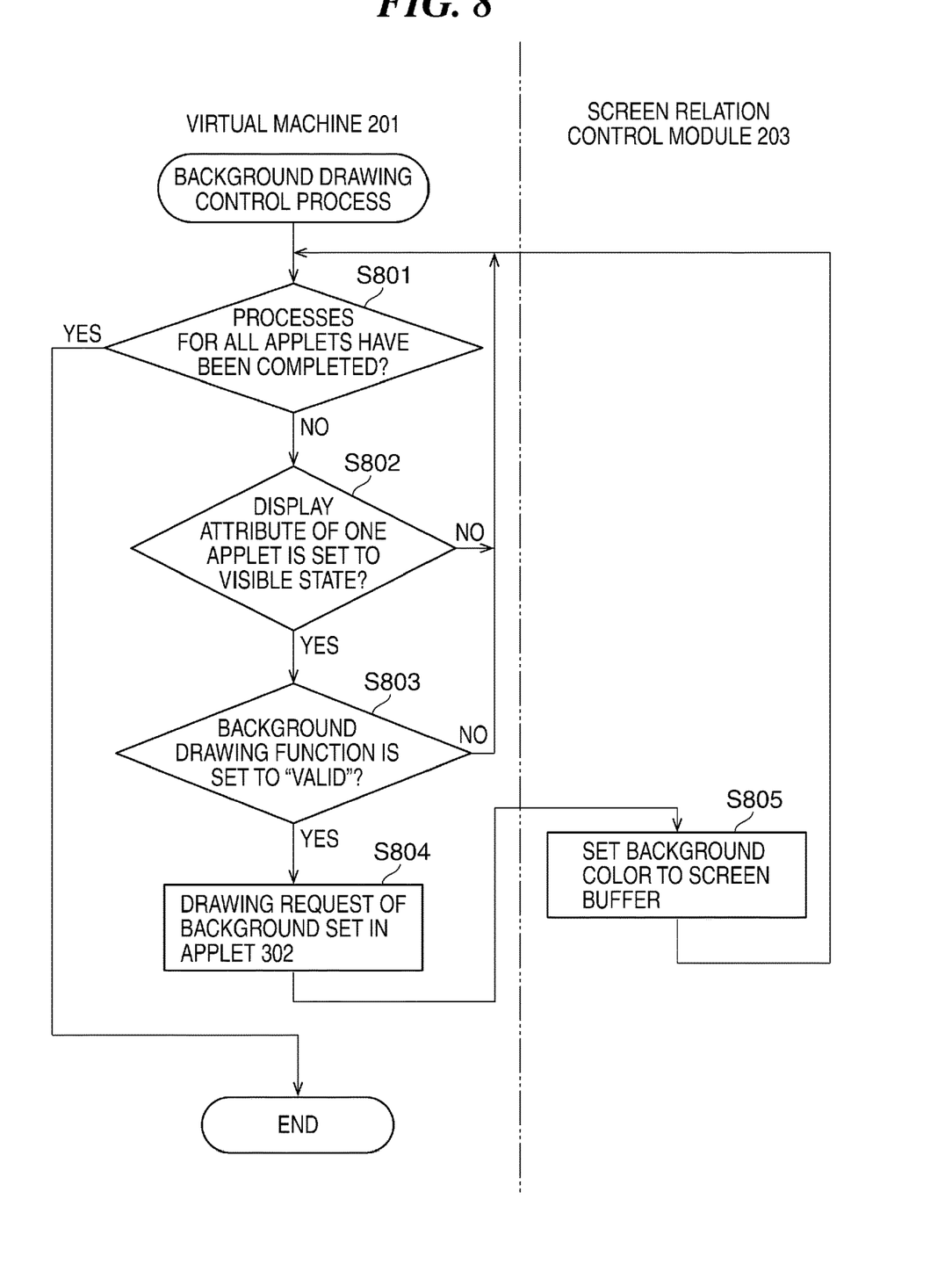
FIG. 8 is a flowchart showing a background drawing control process executed by the MFP shown in FIG. 1.

FIG. 8 is a flowchart showing a background drawing control process executed by the MFP 100 shown in FIG. 1.

The process in FIG. 8 is executed by the virtual machine 201 and the screen relation control module 203 when the CPU 102 runs the program stored in the ROM 104. The process in FIG. 8 is premised on the case where the virtual machine 201 received the display request for the extended-application GUI.

As shown in FIG. 8, when receiving the display request for the extended-application GUI, the virtual machine 201 determines whether processes for all the registered applets have been completed (S801).

As a result of the determination in the step S801, when the processes for all the registered applets have been completed, the virtual machine 201 finishes this process. On the other hand, as a result of the determination in the step S801, when the processes for any applets have not been completed, the virtual machine 201 selects one applet from among the applets of which the processes have not been completed, and determines whether the display attribute of the selected applet is set to the visible state (step S802).

As a result of the determination in the step S802, when the display attribute of the selected applet is not set to the visible state, the virtual machine 201 returns the process to the step S801. On the other hand, as a result of the determination in the step S802, when the display attribute of the selected applet is set to the visible state, the virtual machine 201 determines whether the setting of the background drawing function in association with the selected applet is set to "VALID" (step S803).

As a result of the determination in the step S803, when the setting of the background drawing function is set to "INVALID", the virtual machine 201 returns the process to the step S801. On the other hand, as a result of the determination in the step S803, when the setting of the background drawing function is set to "VALID", the virtual machine 201 sends the drawing request of the background set in the selected applet 302 to the screen relation control module 203 (step S804). Next, the screen relation control module 203 sets the background color of the drawing request concerned to the screen buffer (step S805), and finishes this process. After that, the extended application 208 executes the drawing process for the extended-application GUI according to the specification. For example, when the specification defines that the extended application 208 draws a background, the extended application 208 executes the drawing process for all the extended-application GUI including the background. On the other hand, when the specification defines that the extended application 208 does not draw a background, the extended application 208 executes the drawing process for the extended-application GUI other than the background. Thereby, the extended-application GUI is displayed on the display unit 111.

According to the above-mentioned embodiment, when "FALSE", which shows that the specification defines that the extended application 208 draws the background, is not set to the attribute information 209 (i.e., when "TRUE" is set to the attribute information 209, or when no attribute information is set to the extended application 208), it is set so that the virtual machine 201 executes the background drawing process. This avoids the situation where the background of the extended-application GUI concerned is not drawn when the extended-application GUI is displayed, and prevents an incomplete extended-application GUI from displaying.

Moreover, when the extended application 208 may not draw the background of the extended-application GUI, the virtual machine 201 certainly draws the background of the extended-application GUI.

Furthermore, in the above-mentioned embodiment, when "FALSE" is set to the attribute information 209, it is set so that the virtual machine 201 does not execute the background drawing process. This avoids the situation where the virtual machine 201 also draws the background of the extended-application GUI when the extended application 208 executes the drawing process for all the extended-application GUI including the background. As a result, a flicker of the display of extended-application GUI resulting from multiple times execution of the background drawing process can be reduced.

In the above-mentioned embodiment, the applet 302 is registered in association with the setting about the background drawing function. Accordingly, it is easily determined whether the virtual machine 201 needs drawing the background when the extended-application GUI is displayed using the registered applet 302.

Moreover, in the above-mentioned embodiment, since the extended application includes the attribute information 209, the specification of the extended application concerned is certainly obtained.

In the above-mentioned embodiment, a user may set up the attribute information 209 about the extended application through the touch panel 110. In such a case, when the user finds an erroneous setting of the attribute information 209 and changes the attribute information 209, a re-install process of an extended application of which the attribute information 209 is reset becomes unnecessary, and accordingly, the setting of the attribute information 209 is changed easily.

Moreover, in the above-mentioned embodiment, data for executing the drawing process of the applet 302 etc. may be analyzed. In such a case, it may be determined whether the specification defines that the extended application 208 does not draw the background on the basis of the analysis result. Thereby, even if the extended application 208 does not include the attribute information 209, it is specified whether the virtual machine 201 needs drawing the background.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-153652, filed Aug. 4, 2016, which is hereby incorporated by reference herein in its entirety.

What is claimed is:

1. An application execution apparatus comprising:
    a touch panel unit;
    at least one processor; and
        at least one memory coupled to the at least the one processor and having stored thereon instructions which, when executed by the at least the one processor, cause the at least the one processor to
        refer to background attribute information of an installed application showing whether the installed application draws a background of an image when a user performs input operation on the touch panel unit,
    wherein when the installed application transmits a display request to a virtual machine which controls the installed application, the installed application draws the background of the image in a case where the background attribute information of the installed application shows that the installed application needs to draw the background of the image, and the virtual machine draws the background of the image in a case where the background attribute information of the installed application shows that the installed application does not need to draw the background of the image.

2. The application execution apparatus according to claim 1, wherein in a case where a setting is not set such that the installed application draws the background of the image to the background attribute information, either the setting is set such that (i) the installed application does not draw the background of the image to the background attribute information or such that (ii) no background attribute information is set to the installed application.

3. The application execution apparatus according to claim 1, wherein said virtual machine does not draw the background of the image when setting is set such that the installed application draws the background of the image to the background attribute information.

4. The application execution apparatus according to claim 1, the processor being configured to register drawing information, based on the background attribute information, for drawing the image,
    wherein the drawing information is registered, in association with setting by a setting unit.

5. The application execution apparatus according to claim 1, at least the one processor being configured to allow the user set the background attribute information.

6. The application execution apparatus according to claim 1, wherein the stored instructions which, when executed by the at least the one processor, cause the at least the one processor to
    set a setting of the application execution apparatus so that the virtual machine draws the background when the setting is not set that the installed application draws the background of the image to the background attribute information.

7. The application execution apparatus according to claim 1, wherein at least the one memory further stores data in which the background attribute information is assigned to each of the installed applications.

8. A control method for an application execution apparatus equipped with a virtual machine that controls an installed application and a touch panel unit, the control method comprising:
    referring to background attribute information of the installed application showing whether the installed application draws a background of an image when a user performs input operation on the touch panel unit,
    wherein when the installed application transmits a display request to a virtual machine which controls the installed application, the installed application draws the background of the image in a case where the background attribute information of the installed application shows that the installed application needs to the background of the image, and the virtual machine draws the background of the image in a case where the background attribute information of the installed application shows that the installed application does not need to draw the background of the image.

9. A non-transitory computer-readable storage medium storing a control program causing a computer to execute a control method for an application execution apparatus equipped with a virtual machine that controls an installed application and a touch panel unit, the control method comprising:
referring to background attribute information of the installed application showing whether the installed application draws a background of an image when a user performs input operation on the touch panel unit,
wherein when the installed application transmits a display request to a virtual machine which controls the installed application, the installed application draws the background of the image in a case where the background attribute information of the installed application shows that the installed application needs to draw the background of the image, and the virtual machine draws the background of the image in a case where the background attribute information of the installed application shows that the installed application does not need to draw the background of the image.

10. A non-transitory computer-readable storage medium storing a control program causing a computer to execute an application installed in an application execution apparatus characterized in that
the program includes background attribute information of the installed application showing whether the application draws a background of an image when a user performs input operation on a touch panel unit of the application execution apparatus,
wherein when the installed application transmits a display request to a virtual machine which controls the installed application, the installed application draws the background of the image in a case where the background attribute information of the installed application shows that the installed application needs to draw the background of the image, and the virtual machine draws the background of the image in a case where the background attribute information of the installed application shows that the installed application does not need to draw the background of the image.

* * * * *